(12) United States Patent
Higuchi et al.

(10) Patent No.: US 11,495,064 B2
(45) Date of Patent: Nov. 8, 2022

(54) VALUE-ANTICIPATING COOPERATIVE PERCEPTION WITH AN INTELLIGENT TRANSPORTATION SYSTEM STATION

(71) Applicant: Toyota Motor Engineering & Manufacturing North America, Inc., Plano, TX (US)

(72) Inventors: Takamasa Higuchi, Mountain View, CA (US); Shunsuke Aoki, Mountain View, CA (US); Onur Altintas, Mountain View, CA (US)

(*) Notice: Subject to any disclaimer, the term of this patent is extended or adjusted under 35 U.S.C. 154(b) by 268 days.

(21) Appl. No.: 16/991,864

(22) Filed: Aug. 12, 2020

(65) Prior Publication Data

US 2022/0051491 A1 Feb. 17, 2022

(51) Int. Cl.
*G07C 5/08* (2006.01)
*H04W 4/44* (2018.01)
*G07C 5/00* (2006.01)

(52) U.S. Cl.
CPC .......... *G07C 5/0808* (2013.01); *G07C 5/008* (2013.01); *G07C 5/0841* (2013.01); *H04W 4/44* (2018.02)

(58) Field of Classification Search
CPC .... G07C 5/0808; G07C 5/008; G07C 5/0841; H04W 4/44
See application file for complete search history.

(56) References Cited

U.S. PATENT DOCUMENTS

| 7,994,902 | B2 | 8/2011 | Avery et al. |
| 9,723,473 | B2 | 8/2017 | Shimizu et al. |
| 10,178,531 | B2* | 1/2019 | Nguyen ................... H04W 4/06 |
| 10,843,694 | B2* | 11/2020 | Schmidt ................ B60W 30/09 |
| 2018/0101177 | A1* | 4/2018 | Cohen ................... B60W 30/09 |

FOREIGN PATENT DOCUMENTS

JP 2017187863 6/2019

* cited by examiner

*Primary Examiner* — Sizo B Vilakazi
(74) *Attorney, Agent, or Firm* — Burbage Law, P.C.; Jon-Michael Burbage

(57) ABSTRACT

The disclosure includes embodiments for providing value-based sensor data suppression in a cooperative perception message transmission by an ego vehicle. A method includes ascertaining, by a processor of the ego vehicle, a mounting height of a first sensor of the ego vehicle. The method includes calculating a value of sensor data recorded by the first sensor based on the mounting height. The method includes determining a satisfaction state of a threshold based on the value. The method includes determining to transmit the cooperative perception message without the sensor data based on the satisfaction date of the threshold so that value-based sensor data suppression is achieved. The sensor data is suppressed because it is not included in a payload of the cooperative perception message. The suppression is value-based because the sensor data is suppressed responsive to the threshold for value not being satisfied.

20 Claims, 12 Drawing Sheets

VALUE-ANTICIPATING COOPERATIVE PERCEPTION WITH AN INTELLIGENT TRANSPORTATION SYSTEM STATION

BACKGROUND

The specification relates to value-anticipating cooperative perception with an intelligent transportation system (ITS) station.

Modern vehicles include Advanced Driver Assistance Systems (herein "ADAS systems") or automated driving systems. An automated driving system is a collection of ADAS systems which provides sufficient driver assistance that a vehicle is autonomous. ADAS systems and automated driving systems are referred to as "vehicle control systems." An example of a vehicle control system according to some embodiments an ADAS system or an autonomous driving system (e.g., a collection of ADAS systems).

A particular vehicle that includes these vehicle control systems is referred to herein as an "ego vehicle" and other vehicles in the vicinity of the ego vehicle are referred to as "remote vehicles."

Modern vehicles collect a lot of data describing their environment. An ego vehicle uses this image data to understand their environment and operate their vehicle control systems (e.g., ADAS systems or automated driving systems).

Connected vehicles form clusters of interconnected vehicles (e.g., via vehicle-to-everything, i.e., "V2X") that are located at a similar geographic location. Distributed data storage and computing by a cluster of connected vehicles is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using clusters removes the need for connected vehicles to access remote cloud servers or edge servers by vehicle-to-network (V2N) communications (e.g., by cellular networks) whenever they need to get access to computing resources such as shared data (e.g., high-definition road map for automated driving), shared computational power, and cloudification services.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for value-based sensor data suppression in a cooperative perception message transmission by an ego vehicle, the method including: ascertaining, by a processor of the ego vehicle, a mounting height of a first sensor of the ego vehicle; calculating a value of sensor data recorded by the first sensor based on the mounting height; determining a satisfaction state of a threshold based on the value; and determining to transmit the cooperative perception message without the sensor data based on the satisfaction state of the threshold so that value-based sensor data suppression is achieved. Other embodiments of this aspect include corresponding computer systems, apparatus, and computer programs recorded on one or more computer storage devices, each configured to perform the actions of the methods.

Implementations may include one or more of the following features. The method where the mounting height describes a vertical height of a mounting point of the first sensor relative to a surface beneath the ego vehicle. The method where the value is higher when the mounting height is higher. The method where the value is lower if the mounting height is lower. The method where the value is further calculated based on whether a first field of view of the first sensor overlaps a second field of view of a second sensor that is an element of a roadside device. The method where the value is higher when an overlap between the first field of view and the second field of view is less. The method where the value is lower when an overlap between the first field of view and the second field of view is more. The method where the roadside device is not in motion. The method where the value is further calculated based on whether sensor data includes information about an object that is occluded from a field of view of a second sensor that is an element of a roadside device. The method where the value is higher when the sensor data includes information about the object. The method where the value is lower when the sensor data does not include information about the object. Implementations of the described techniques may include hardware, a method or process, or computer software on a computer-accessible medium.

One general aspect includes a computer program product included in at least one onboard vehicle computer for providing value-based sensor data suppression in a cooperative perception message transmission by an ego vehicle, the computer program product including computer code that is operable, when executed by the onboard vehicle computer, to cause the onboard vehicle computer to execute steps including: ascertaining, by a processor of the ego vehicle, a mounting height of a first sensor of the ego vehicle; calculating a value of sensor data recorded by the first sensor based on the mounting height; determining a satisfaction state of a threshold based on the value; and determining to transmit the cooperative perception message without the sensor data based on the satisfaction state of the threshold so that value-based sensor data suppression is achieved. Other embodiments of this aspect include corresponding computer systems, apparatus, and computer programs recorded on one or more computer storage devices, each configured to perform the actions of the methods.

Implementations may include one or more of the following features. The computer program product where the mounting height describes a vertical height of a mounting point of the first sensor relative to a surface beneath the ego vehicle. The computer program product where the value is higher when the mounting height is higher. The computer program product where the value is lower if the mounting height is lower. The computer program product where the value is further calculated based on whether a first field of view of the first sensor overlaps a second field of view of a second sensor that is an element of a roadside device. The computer program product where the value is higher when an overlap between the first field of view and the second field of view is less. The computer program product where the value is lower when an overlap between the first field of view and the second field of view is more. The computer program product where the roadside device is not in motion. Implementations of the described techniques may include hardware, a method or process, or computer software on a computer-accessible medium.

One general aspect includes a system included in a connected vehicle for providing value-based sensor data suppression in a cooperative perception message transmission by an ego vehicle, the system including: a processor; a communication unit communicatively coupled to the processor; and a non-transitory memory communicatively coupled to the processor and the communication unit, where the non-transitory memory stores executable code that is operable, when executed by the processor, to cause the processor to: ascertain, by a processor of the ego vehicle, a mounting height of a first sensor of the ego vehicle; calculate a value of sensor data recorded by the first sensor based on the mounting height; determine a satisfaction state of a threshold based on the value; and determine to transmit the cooperative perception message without the sensor data based on the satisfaction state of the threshold so that value-based sensor data suppression is achieved. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Modern vehicles include ADAS systems or automated driving systems. These systems are referred to herein collectively or individually as "vehicle control systems." An example of a vehicle control system according to some embodiments includes the vehicle control system 250 depicted in FIG. 2.

Figure 1:
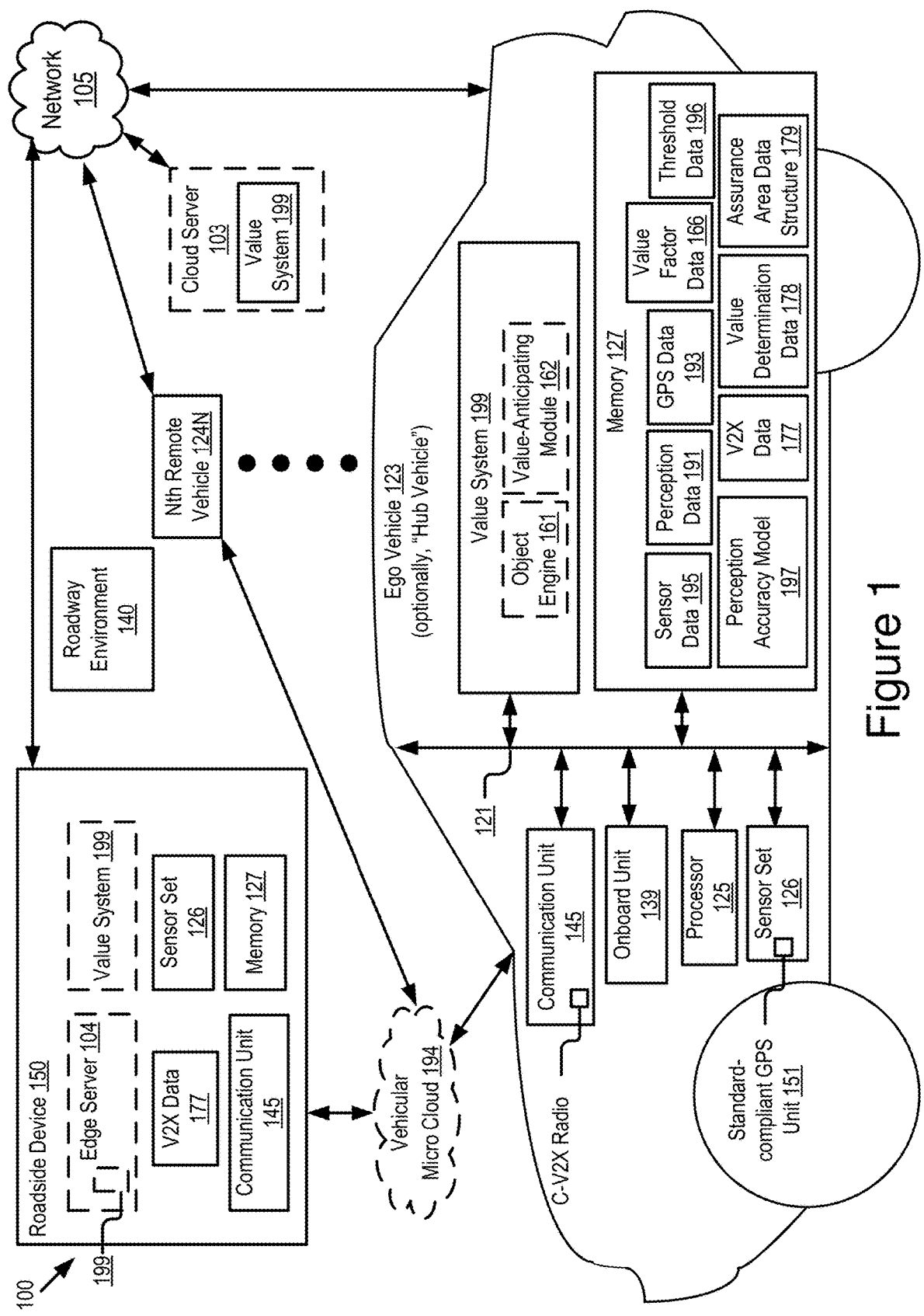
FIG. 1 is a block diagram illustrating an operating environment for a value system according to some embodiments.

A particular vehicle that includes these vehicle control systems is referred to herein as an "ego vehicle" and other vehicles in the vicinity of the ego vehicle as "remote vehicles." As used herein, the term "vehicle" includes a connected vehicle that includes a communication unit and is operable to send and receive V2X communications via a wireless network (e.g., the network 105 depicted in FIG. 1).

An intelligent transportation system (ITS) includes a network of connected devices (e.g., connected vehicles and roadside devices) that work together to help vehicles make driving decisions. The ITS includes stations which are referred to herein as "stations," "ITS stations," or "remote ITS stations." The ITS stations are similar to the nodes of a wireless network in that the stations are the devices that are sending and receiving wireless messages to one another in order to provide the functionality of the ITS. An ITS station includes, for example, a connected vehicle (e.g., an ego vehicle, a remote vehicle) and a roadside device having network communication capability such as a roadside unit (RSU).

In some embodiments, a roadside device includes and RSU or any other stationary processor-based computing device in the roadway environment including a processor, a non-transitory memory, and network communication capability. An example of a roadside device according to some embodiments includes the roadside device 150 depicted in FIG. 1.

One example of the functionality of an ITS includes cooperative perception. Modern vehicles collect a lot of data describing their environment, in particular image data. An ego vehicle uses this image data to understand their environment and operate their vehicle control systems (e.g., ADAS systems or automated driving systems). Cooperative perception occurs when remote ITS stations (e.g., a remote vehicle, a roadside device, etc.) shares their sensor data with the ego vehicle and the ego vehicle uses this digital data to understand their environment and operate their vehicle control systems.

Cooperative Perception

Connected vehicles analyze measurements from their on-board sensors (e.g., cameras, radars, lidars, etc.) by a perception algorithm to detect, classify, and localize the surrounding road objects. Examples of road objects include one or more of the following: other vehicles; bikes; motorcycles; pedestrians; obstacles on road; roadway infrastructure such as medians, walls, etc.

For improved safety, connected vehicles may periodically broadcast Cooperative Perception Messages ("CPM" if singular, "CPMs" if plural). CPMs include a payload. The payload includes V2X data. V2X data includes digital data that describes, among other things, information about detected objects. In some embodiments, the V2X data is digital data that describes the following example types of information about the road objects: road object type; current position; historical position; projected future position; heading; velocity; and various other dynamic states.

Vehicles that receive CPMs may fuse a set of received V2X data with its own sensor measurements to improve coverage and accuracy of the receiver vehicle's environmental perception.

V2X Channel Overloading Problem

Cooperative perception has numerous problems. One example problem with cooperative perception is that V2X communication channels can be overloaded when: (1) vehicle density is high [e.g., in a city or at rush hour]; and (2) there are a threshold number of road objects in the environment [e.g., in a city or some other environment that includes a number of road objects that satisfies a predetermined threshold affecting the size of V2X data to be transmitted so that the V2X data is of a file size that, collectively across numerous ITS stations, overloads the V2X communication channels used for transmitting CPMs]. The excessive network load generated by cooperative perception deployment may cause frequent losses of V2X data messages, which increases the risk that vehicles will fail to accurately perceive some of the road objects described by the V2X data. This is referred to as the V2X channel overloading problem.

CPM Suppression

One possible solution to the V2X Channel overloading problem is to cause vehicles that have either less accurate sensors and/or a poorer Field of View (FOV) to suppress their transmission of CPMs since the V2X data included in these CPSs is thought to be less valuable due to the poor sensors or the poor FOV relative to other endpoints (e.g., other vehicles, RSUs, etc.).

CPM suppression includes indiscriminately causing selected ITS stations to cease their transmission of CPMs. This is problematic because these CPMs may include valuable V2X data that describes roadway objects that are either: (1) missed by other ITS stations (i.e., not observed by other ITS stations); and/or (2) misperceived by other ITS stations.

Described herein are embodiments of a value system. The embodiments described herein are improvement over the CPM suppression solution to the V2X Channel overloading problem because the embodiments described herein ensure that CPMs that include valuable V2X data (i.e., "valuable CPMs") are always transmitted by ITS stations.

Example General Rules for FOV

The follow are example general rules for FOV executed by the value system in some embodiments: (1) ITS stations whose sensors are mounted higher relative to the road surface generally have a better FOV; and (2) ITS stations whose geographic position is static and not dynamic generally have a better FOV. An ITS station is static when it is not in motion. An ITS station is dynamic when it is in motion. Because of these two general rules, the value system includes codes and routines that are configured to assume that roadside devices have the best quality V2X data relative to vehicles. This is because: (1) roadside devices generally have sensors that are mounted higher relative to the road surface when compared to the general mounting position of the sensors on most vehicles; and (2) roadside devices have a static geographic position whereas vehicles are in motion much of the time they are present on a roadway.

Accordingly, based on the general rules described above, other factors considered by the value system in determining whether to suppress an ITS station's CPM transmission include one or more of the following: (1) whether the endpoint is a roadside device; and (2) whether the ITS station's sensor measurements overlaps a perception region of a roadside device or some other ITS station whose sensors are high quality or have a FOV that satisfies a height requirement. The height requirement is satisfied if the sensors of the ITS station are mounted high relative to the road surface in comparison to other ITS stations.

In some embodiments, the ITS stations transmit V2X messages that include V2X data. The V2X data includes digital data describing the mounting height of their sensors, whether the ITS station is a roadside device; and technical attributes of the ITS stations such that different ITS stations that receive the V2X message are able to compare the relative quality of different ITS station sensors. These V2X messages may be broadcast or unicast; these transmissions may occur at some predetermined regular interval. These V2X messages beneficially enable the value systems of the ITS stations to apply the example general rules described above. In this way, the various ITS stations acquire some or all of the digital data needed to apply the example general rules for FOV and/or the other factors considered by the value system in determining whether to suppress an ITS station's CPM transmission. An example of the V2X data according to some embodiments includes the V2X data 177 depicted in FIG. 1.

In some embodiments, value factor data includes any digital data that describes (1) information relevant to the example general rules for FOV and/or (2) the other factors considered by the value system in determining whether to suppress an ITS station's CPM transmission. In some embodiments, the value factor data includes digital data that describes the mounting height of their sensors, whether the ITS station is a roadside device; and technical attributes of the ITS stations such that different ITS stations that receive the V2X message are able to compare the relative quality of different ITS station sensors. An example of the value factor data according to some embodiments includes the value factor data 166 depicted in FIG. 1.

Problem Statement

A problem is how to avoid suppression of valuable CPMs. A valuable CPM is one whose payload includes V2X data describing roadway objects that are either: (1) missed by other endpoints (i.e., not observed by other endpoints); and/or (2) misperceived by other endpoints.

Example Solution

The embodiments described herein solve numerous problems in addition to providing a solution to the problem described above. For example, a benefit of some of the embodiments is to provide a solution which determines the value of the V2X data included in CPMs and then suppresses less valuable CPMs while also not suppressing the transmission of valuable CPMs.

A valuable CPM is one which includes V2X data that has some or all of the following qualities: (1) it was recorded by accurate sensors; (2) it was recorded with a sensor mounted high relative to the road surface when compared to other sensors in the road environment [e.g., sensors having a "bird's eye view"]; (3) it was recorded by a roadside device [e.g., an RSU]; (4) the sensor measurements do not overlap the perception region of a roadside device; and (5) the sensor measurements do not overlap the perception region of any other endpoint, whether they be an roadside device or some other endpoint.

A not valuable CPM, or an "un-valuable CPM," is one whose V2X data does not have the qualities and attributes of the V2X data included in a valuable CPM.

Vehicular Micro Cloud

Distributed data storage and computing by a cluster of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to computing resources such as shared data (e.g., high-definition road map for automated driving), shared computational power, and cloudification services.

Vehicle Cloudification

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "computational tasks."

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the ITS stations described herein are micro cloud members. For example, the following elements of FIG. 1 are ITS stations: ego vehicle 123; Nth remote vehicle 124N; roadside device 150. In some embodiments, these ITS stations are also micro cloud members of the vehicular micro cloud 194.

Vehicular micro clouds are not an essential part of the embodiments described herein. Some embodiments do not include a vehicular micro cloud.

In some embodiments, the communication unit of an ego vehicle includes a V2X radio. The V2X radio operates in compliance with a V2X protocol. In some embodiments, the V2X radio broadcasts Basic Safety Messages ("BSM" or "safety message" if singular, "BSMs" or "safety messages" if plural). In some embodiments, the safety messages broadcast by the communication unit include some or all of the V2X data as its payload. In some embodiments, the V2X data is included in part 2 of the safety message as specified by the Dedicated Short-Range Communication (DSRC) protocol.

In some embodiments, a connected vehicle that includes the value system also broadcasts BSMs, and these BSMs include the V2X data so that other connected vehicles that receive the BSMs also have access to the V2X data for this connected vehicle and other connected vehicles in the vicinity that have a value system and broadcast BSMs.

As used herein, the term "vehicle" refers to a connected vehicle. For example, the ego vehicle and remote vehicle depicted in FIG. 1 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

In some embodiments, the value system improves the performance of a network because it beneficially takes steps to reduce or eliminate the latency problem described above.

In some embodiments, the value system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a roadside unit. For the purpose of clarity, the N remote vehicles may be referred to herein as the "remote vehicle" or the "remote vehicles" and this will be understood to describe N remote vehicles.

An example of a roadway environment according to some embodiments includes the roadway environment 140 depicted in FIG. 1. As depicted, the roadway environment 140 includes objects. Some of these objects may be engaged in anomalous behavior. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

In some embodiments, the ego vehicle and some or all of the remote vehicles include their own instance of a value system. For example, in addition to the ego vehicle, some or all of the remote vehicles include an onboard unit having an instance of the value system installed therein.

Accordingly, multiple instances of the value system are installed in a group of connected vehicles. The group of connected vehicles may be arranged as a vehicular micro cloud or some other vehicular cloud. In some embodiments, the ego vehicle and one or more of the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 1.

Hub

Figure 3:
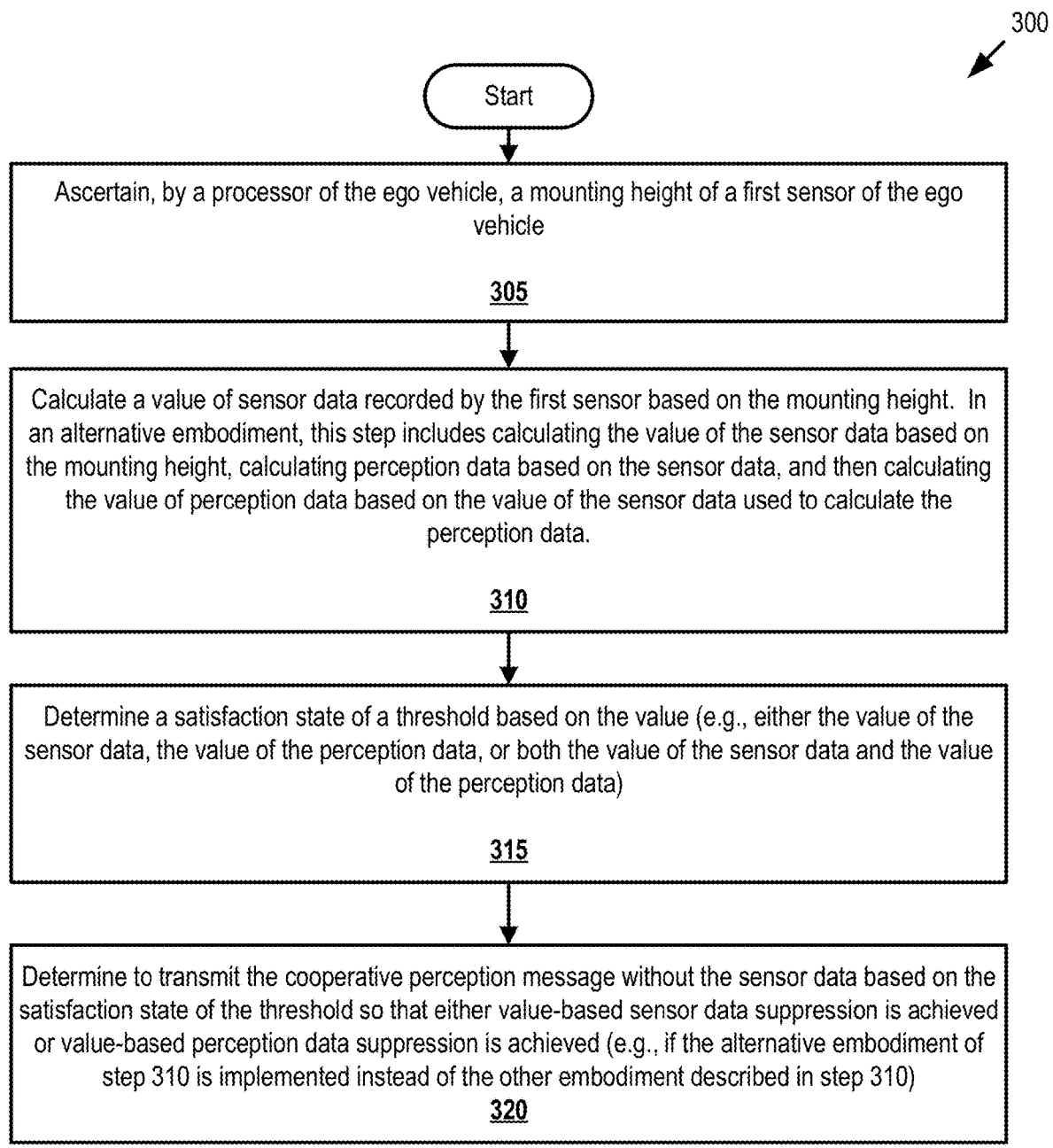
FIG. 3 is a flowchart of an example method for value-anticipating cooperative perception with an ITS according to some embodiments.
Figure 11:
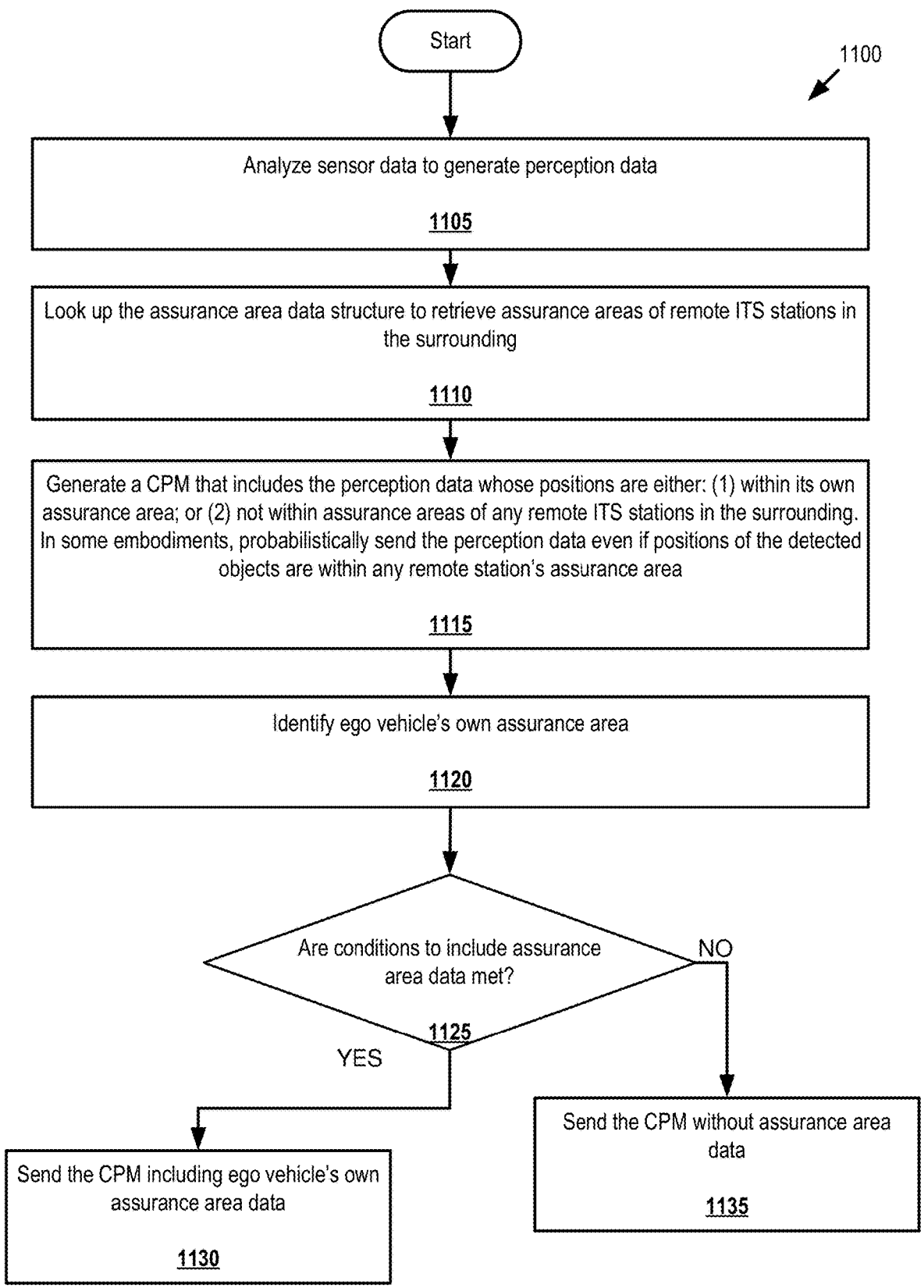
FIG. 11 is a flowchart of an example method for transmitting a CPM according to some embodiments.
Figure 12:
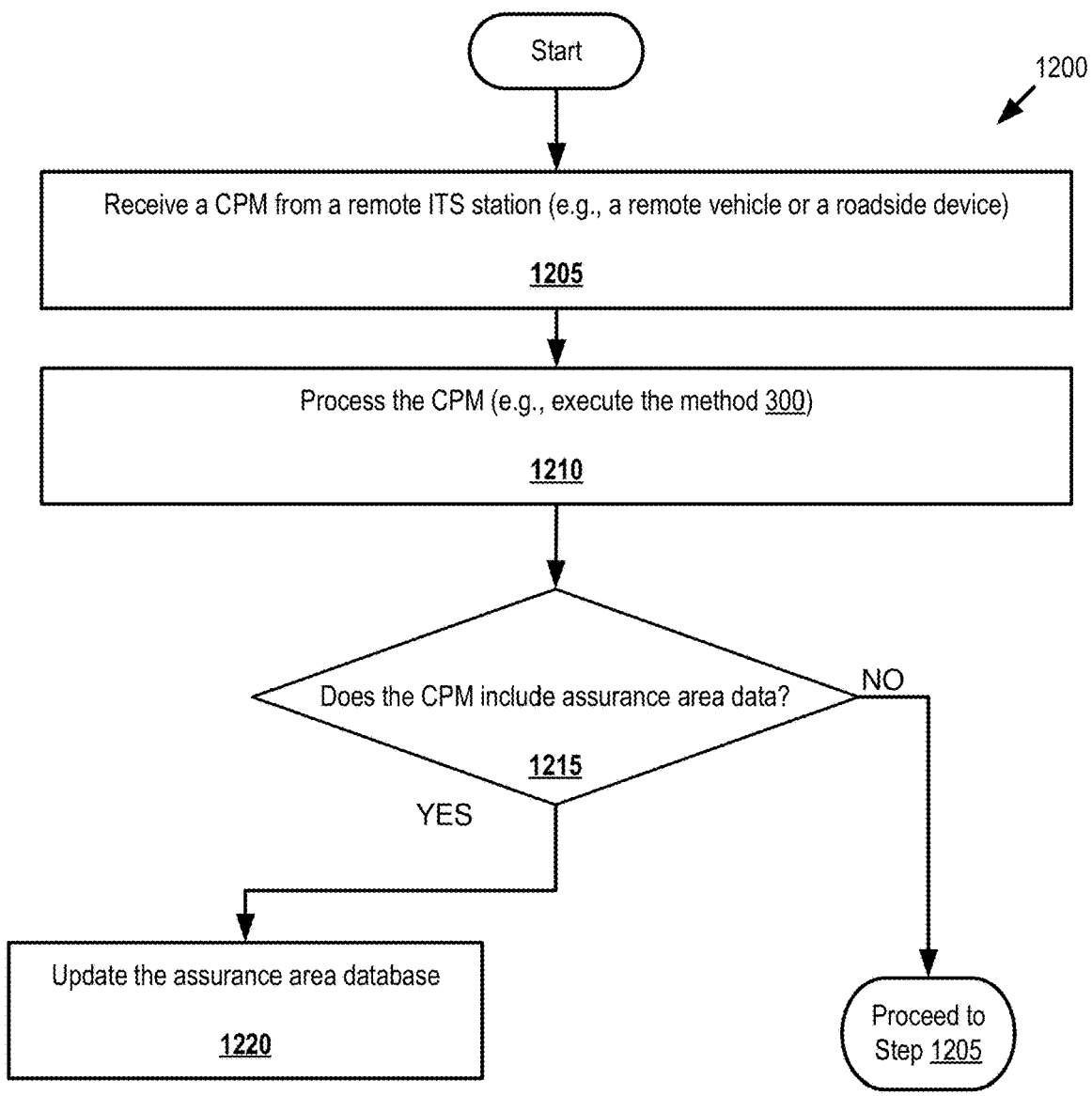
FIG. 12 is a flowchart of an example method for receiving a CPM according to some embodiments.

In some embodiments, the value system that executes a method as described herein (e.g., one or more of the methods 300, 1100, 1200 depicted in FIGS. 3, 11, and 12, respectively) is an element of a hub or a hub vehicle. For example, the vehicular micro cloud formed by the value system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the roadside device 150 is the hub of the vehicular micro cloud 194.

In some embodiments, the value system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most memory most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. In some embodiments, the technical data is included in the V2X data 177 broadcast by vehicles.

A vehicle's sensor data is the digital data recorded by that vehicle's onboard sensor set 126. An example of the sensor data according to some embodiments includes the sensor data 195 depicted in FIG. 1. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the value system is operable to provide its functionality to operating environments and network architectures that do not include a server. Use of servers is problematic because they create latency. For example, some prior art systems require that groups of vehicles relay all their messages to one another through a server. By comparison, the use of server is an optional feature in for the value system. For example, the update client is an element of a roadside unit that includes a communication unit 145 but not a server. In another example, the update client is an element of another vehicle such as one of the remote vehicles 124.

In some embodiments, the value system is operable to provide its functionality even though the vehicle which includes the value system does not have a Wi-Fi antenna as part of its communication unit. By comparison, some of the existing solutions require the use of a Wi-Fi antenna in order to provide their functionality. Because the value system does not require a Wi-Fi antenna, it is able to provide its functionality to more vehicles, including older vehicles without Wi-Fi antennas.

In some embodiments, the value system is operable to provide its functionality even though the vehicle which includes the value system does not have a V2X radio as part of its communication unit. By comparison, some of the existing solutions require the use of a V2X radio in order to provide their functionality. Because the value system does not require a V2X radio, it is able to provide its functionality to more vehicles, including older vehicles without V2X radios.

In some embodiments, the value system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the value system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the value system manages the vehicular micro cloud so that it is accessible for membership by vehicles which do not have V2V communication capability. This is beneficial because it ensures that legacy vehicles have access to the benefits provided by the vehicular micro cloud. The existing approaches do not provide this functionality.

In some embodiments, the value system is configured so that a particular vehicle (e.g., the ego vehicle) is pre-designated by a vehicle manufacturer to serve as a hub vehicle for any vehicular micro cloud that it joins. The existing approaches do not provide this functionality.

The existing solutions generally do not include vehicular micro clouds. Some groups of vehicles (e.g., cliques) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one. Accordingly, any group of vehicles that includes a server or whose functionality incorporates a server is not a vehicular micro cloud as this term is used herein.

In some embodiments, a vehicular micro cloud is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of the methods described herein (e.g., method 300, method 1100, and/or method 1200) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

A vehicular micro cloud is responsible to doing computational analysis itself using the onboard vehicle computers of its members. A group of vehicles which relies on a cloud server for its computational analysis, or the difficult parts of its computational analysis, is not a vehicular micro cloud. Although FIG. 1 depicts a server in an operating environment that includes the value system, the server is an optional feature of the operating environment. An example of a preferred embodiment of the value system does not include the server in the operating environment which includes the value system.

In some embodiments, the value system enables a group of vehicles to perform computationally expensive tasks that could not be completed by any one vehicle in isolation.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of the GPS data according to some embodiments includes the GPS data 193 depicted in FIG. 1. An example of a standard-compliant GPS unit according to some embodiments includes the standard-compliant GPS unit 151 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the value system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

Vehicular Network

The value system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the value system includes software installed in an onboard unit of a connected vehicle. This software is the "value system" described herein.

An example operating environment for the embodiments described herein includes an ego vehicle and one or more remote vehicles. The ego vehicle the remote vehicle are connected vehicles having communication units that enable them to send and receive wireless messages via one or more vehicular networks. In some embodiments, the ego vehicle and the remote vehicle include an onboard unit having a value system stored therein. An example of a preferred embodiment of the value system includes a serverless operating environment. A serverless operating environment is an operating environment which includes at least one value system and does not include a server.

In some embodiments, the value system includes code and routines that are operable, when executed by a processor of the onboard unit, to cause the processor to execute one or more of the steps of one or more of the following: the method 300 depicted in FIG. 3; the method 1100 depicted in FIG. 11; and the method 1200 depicted in FIG. 12.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

Example Operative Environment

Embodiments of the value system are now described. An example operating environment for the value system is depicted in FIG. 1.

In some embodiments, the value system is software installed in an onboard unit (e.g., an electronic control unit ECU)) of an ego vehicle having V2X communication capability.

In some embodiments, the operating environment includes a network. In some embodiments, the network is a V2X network. The devices communicatively coupled to the network are referred to as "endpoints," "stations," or "ITS stations." In some embodiments, the value system is installed in endpoints other than the ego vehicle such as the roadside unit (RSU).

In some embodiments, the operating environment includes N number of connected vehicles. The "Nth vehicles" are a set of connected vehicles that are members of the same vehicular micro cloud as the ego vehicle. These vehicles also include a value system if they are manufactured by a particular manufacturer.

An example method for transmission of cooperative perception messages ("CPM" if singular, "CPMs" if plural) is now described according to some embodiments. In some embodiments, the value system includes code and routines that are operable, when executed by a processor, to cause the processor to execute one or more of the following steps of the method for transmitting CPMs In some embodiments, each of the Nth vehicles included in the operating environment, as well as the ego vehicle, are operable to execute one or more of the following steps: (1) cause their sensors to record sensor data; (2) build perception data based on the sensor data; (3) build V2X data that include the perception data (potentially among other types of data); and (4) transmit CPMs at some interval that includes the V2X data as its payload.

Referring now to FIG. 1, depicted is a block diagram illustrating an operating environment 100 for a value system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123"); an Nth remote vehicle 124 (where "N" refers to any positive whole number greater than one); a roadside device 150; and a cloud server 103. These elements are communicatively coupled to one another via a network 105. These elements of the operating environment 100 are depicted by way of illustration. In practice, the operating environment 100 may include one or more of the elements depicted in FIG. 1. The Nth remote vehicle 124 may be referred to as a remote vehicle 124.

The operating environment 100 also includes the roadway environment 140. The roadway environment 140 was described above, and that description will not be repeated here.

In some embodiments, one or more of the ego vehicle 123, the remote vehicle 124, and the network 105 are elements of a vehicular micro cloud 194. The vehicular micro cloud 194 is depicted in FIG. 1 with a dashed line to indicate that it is an optional element of the operating environment 100 in some embodiments.

The cloud server 103 is depicted with a dashed line to indicate that it is an optional feature of the operating environment 100. As depicted, the roadside device 150 includes an edge server 104.

In some embodiments, the ego vehicle 123, the remote vehicle 124, the edge server 104, and the cloud server 103 include similar elements. For example, each of these elements of the operating environment 100 include their own processor 125, bus 121, memory 127, communication unit 145, processor 125, sensor set 126, onboard unit 139 (not included in the edge server 104 or the cloud server 103), standard-compliant GPS unit 151 (not included in the edge server 104 or the cloud server 103), and value system 199. These elements of the ego vehicle 123, the remote vehicle 124, the edge server 104, and the cloud server 103 provide the same or similar functionality regardless of whether they are included in the ego vehicle 123, the remote vehicle 124, the edge server 104, and the cloud server 103. Accordingly, the descriptions of these elements will not be repeated in this description for each of the ego vehicle 123, the remote vehicle 124, the edge server 104, and the cloud server 103.

In the depicted embodiment, the ego vehicle 123, the remote vehicle 124, the edge server 104, and the cloud server 103 store similar digital data. In some embodiments, the remote vehicle 124, the edge server 104, and the cloud server 103 store some or all of the digital data depicted in FIG. 1 as being stored in the memory 127 of the ego vehicle 123.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference.

In some embodiments, the vehicular micro cloud 194 is a stationary vehicular micro cloud or a mobile vehicular micro cloud. For example, each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, the terms a "vehicular micro cloud" and a "micro-vehicular" cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member."

In some embodiments, the memory 127 of one or more of the endpoints stores member data. The member data is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data describes logical associations between endpoints which are a necessary component of the vehicular micro cloud 194 and serves the differentiate the vehicular micro cloud 194 from a mere V2X network. In some embodiments, a vehicular micro cloud 194 must include a hub vehicle and this is a further differentiation from a vehicular micro cloud 194 and a V2X network or a group or clique of vehicles which is not a vehicular micro cloud 194.

In some embodiments, the vehicular micro cloud 194 does not include a hardware server. Accordingly, in some embodiments the vehicular micro cloud 194 may be described as serverless.

In some embodiments, the vehicular micro cloud 194 includes a server. For example, in some embodiments the edge server 104 is the hub of the vehicular micro cloud 194.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit 151 that is an element of the sensor set 126 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives C-V2X messages via the network 105.

The ego vehicle 123 includes one or more of the following elements: a processor 125; a sensor set 126; a standard-compliant GPS unit 151; a vehicle control system 250; a communication unit 145; an onboard unit 139; a memory 127; and a value system 199. These elements may be communicatively coupled to one another via a bus 121. In some embodiments, the communication unit 145 includes a C-V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an advanced driver assistance system ("ADAS") or autonomous driving system); and a head unit. In some embodiments, the processor 125 is an element of the onboard unit 139.

In some embodiments, the ego vehicle 123 includes an autonomous driving system. An autonomous driving system is a set of ADAS systems that provide sufficient autonomous functionality to the ego vehicle 123 to render the ego vehicle 123 an autonomous vehicle (e.g., National Highway Traffic Safety Administration and the Society of Automotive Engineers Level III or higher).

The onboard unit 139 is a special purpose processor-based computing device. In some embodiments, the onboard unit 139 is a communication device that includes one or more of the following elements: the communication unit 145; the processor 125; the memory 127; and the value system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 151); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record sensor data 195 that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment (e.g., the roadway environment 140) may include a roadway region, parking lot, or parking garage that is proximate to the ego vehicle 123. The sensor data may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the value system 199 based on analysis of the sensor data which is recorded by the ego vehicle 123 and/or one or more of the vehicular micro cloud 194.

In some embodiments, the sensors of the sensor set 126 are operable to collect sensor data 195. The sensors of the sensor set 126 include any sensors that are necessary to measure and record the measurements described by the sensor data 195. In some embodiments, the sensor data 195 includes any sensor measurements that are necessary to generate the other digital data stored by the memory 127. In some embodiments, the sensor data 195 includes any sensor measurements that are necessary for the value system 199 to provide its functionality as described herein with reference to one or more of the following: method 300 depicted in FIG. 3, method 1100 depicted in FIG. 11, and method 1200 depicted in FIG. 12.

The sensor data 195 includes digital data that describes any measurement that is taken by one or more of the sensors of the sensor set 126.

The standard-compliant GPS unit 151 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 151 is operable to generate GPS data 193. In some embodiments, the GPS data 193 includes digital data that describe GPS measurements which are sufficiently accurate to describe the location of the ego vehicle 123 with lane-level accuracy. In some embodiments, the GPS data 193 does not describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 151 is compliant with one or more standards governing V2X communications but does not provide GPS measurements that are lane-level accurate.

In some embodiments, the standard-compliant GPS unit 151 includes any hardware and software necessary to make the ego vehicle 123 or the standard-compliant GPS unit 151 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 151 is operable to provide GPS data 193 describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data 193 so accurately that a precise lane of travel of the ego vehicle 123 may be accurately determined based on the GPS data 193 for this vehicle 123 as provided by the standard-compliant GPS unit 151.

An example process for generating GPS data 193 describing a geographic location of an object (e.g., a queue, the ego vehicle 123, the remote vehicle 124, or some other object located in a roadway environment) is now described according to some embodiments. In some embodiments, the value system 199 include code and routines that are operable, when executed by the processor 125, to cause the processor to: analyze (1) GPS data describing the geographic location of the ego vehicle 123 and (2) sensor data describing the range separating the ego vehicle 123 from an object and a heading for this range; and determine, based on this analysis, GPS data describing the location of the object. The GPS data 193 describing the location of the object may also have lane-level accuracy because, for example, it is generated using accurate GPS data of the ego vehicle 123 and accurate sensor data describing information about the object.

In some embodiments, the standard-compliant GPS unit 151 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible, such as C-V2X. The DSRC standard requires that GPS data be precise enough to infer if two vehicles (one of which is, for example, the ego vehicle 123) are located in adjacent lanes of travel on a roadway. In some embodiments, the standard-compliant GPS unit 151 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the value system 199 described herein may analyze the GPS data provided by the standard-compliant GPS unit 151 and determine what lane the ego vehicle 123 is traveling in based on the relative positions of two or more different vehicles (one of which is, for example, the ego vehicle 123) traveling on a roadway at the same time.

By comparison to the standard-compliant GPS unit 151, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the value system 199 to determine the lane of travel of the ego vehicle 123. This measurement improves the accuracy of the GPS data describing the location of lanes used by the ego vehicle 123 when the value system 199 is providing its functionality.

In some embodiments, the memory 127 stores two types of GPS data 193. The first is GPS data 193 of the ego vehicle 123 and the second is GPS data of one or more objects (e.g., the remote vehicle 124 or some other object in the roadway environment). The GPS data 193 of the ego vehicle 123 is digital data that describes a geographic location of the ego vehicle 123. The GPS data 193 of the objects is digital data that describes a geographic location of an object. One or more of these two types of GPS data 193 may have lane-level accuracy. In some embodiments, one or more of these two types of GPS data 193 are described by the sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the value system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the methods 300, 1100, 1200 are transmitted by the C-V2X radio on the upper 30 MHz of the 5.9 GHz band (i.e., 5.895-5.925 GHz) as directed by the value system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSM messages which are regularly broadcast by the V2X radio (e.g., at an interval of once every 0.10 seconds).

In some embodiments, the V2X radio includes any hardware or software which is necessary to make the ego vehicle 123 compliant with the DSRC standards. In some embodiments, the standard-compliant GPS unit 151 is an element of the V2X radio.

The memory 127 includes a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 195; the GPS data 193; the value factor data 166; the V2X data 177; the perception data 191; the threshold data 196; the perception accuracy model 197; the value determination data 178; and the assurance area data structure 179. The following elements were described above, and so, their descriptions will not be repeated here: the sensor data 195; the GPS data 193; the value factor data 166; and the V2X data 177.

The perception data 191 includes digital data that describes the roadway environment 140. In some embodiments, the value system 199 generates the perception data 191 based on the sensor data 195. For example, the perception data 191 describes an interpretation of the roadway environment 140 based on the sensor measurements described by the sensor data 195; in this way the perception data 191 describes a perception of the roadway environment 140 made by the value system 199.

In some embodiments, the value system 199 includes one or more vehicle control systems and these vehicle control systems are operable to generate the perception data 191 based on the sensor data 195 and any other digital data that is necessary for generating the perception data 191. In some embodiments, the one or more vehicle control systems are not elements of the value system 199 and they generate the perception data 191 based on the sensor data 195 and any other digital data that is necessary for generating the perception data 191

In some embodiments, the perception data 191 includes digital describing information about a set of objects which the sensors of the ego vehicle 123 have perceived in the roadway environment 140. The perception data 191 describes, for example, a type for each object (e.g., vehicle, pedestrian, pothole, animal, debris, crosswalk, intersection, traffic sign, traffic signal, etc.), a location of the object (e.g., its GPS location), and a classification of the objects behavior (e.g., safe, unsafe, potentially unsafe, etc.).

In some embodiments, the value system 199 generates the perception data 191 using the sensor data 195 and other digital data such as object priors and/or the results of digital twin simulations to assist the value system 199 in determining object type and the classification of the object behavior. GPS measurements and ranging finding sensors and other sensor-based methods are used by the value system 199 to determine the geographic locations of the objects.

Examples of digital twin simulations, digital twin data, game engines, and simulation software are described in the following patent applications, the entirety of each of which are hereby incorporated by reference: U.S. patent application Ser. No. 16/691,346 entitled "DIGITAL TWIN SIMULATION-BASED VEHICULAR COMMUNICATION PLANNING" and filed on filed on Nov. 21, 2019; U.S. patent application Ser. No. 16/007,693 entitled "DIGITAL TWIN FOR VEHICLE RISK EVALUATION" and filed on Jun. 13, 2018; U.S. patent application Ser. No. 15/925,070 entitled "SENSOR-BASED DIGITAL TWIN SYSTEM FOR VEHICULAR ANALYSIS" and filed on Mar. 19, 2018; U.S. patent application Ser. No. 16/165,002 entitled "DIGITAL BEHAVIORAL TWIN SYSTEM FOR INTERSECTION MANAGEMENT IN CONNECTED ENVIRONMENTS" and filed on Oct. 19, 2018; U.S. patent application Ser. No. 16/007,796 entitled "COLLISION AVOIDANCE FOR A CONNECTED VEHICLE BASED ON A DIGITAL BEHAVIORAL TWIN" and filed on Jun. 13, 2018; and U.S. patent application Ser. No. 15/908,768 entitled "PROACTIVE VEHICLE MAINTENANCE SCHEDULING BASED ON DIGITAL TWIN SIMULATIONS" and filed on Feb. 28, 2018. In some embodiments, the value system 199 includes any elements described in these patent applications which are necessary to execute digital twin simulations and use the output of digital twin simulations to provide the functionality of the value system 199.

The threshold data 196 includes digital data that describes any of the thresholds that are described herein or otherwise beneficial for the value system 199 to provide its functionality.

The perception accuracy model 197 includes digital data that describes a set of models that define an assurance area for the ego vehicle 123.

In some embodiments, an assurance area includes an area of the roadway environment 140 that are reliably measured by the sensors of a particular ITS station. For example, an assurance area for the ego vehicle 123 includes an area of the roadway environment 140 that is reliably measured by the sensor set 126 of the ego vehicle 123.

In some embodiments, an area of the roadway environment 140 is reliably measured by the sensors of a particular ITS station when the sensor measurements recorded by the sensors are accurate or sufficiently accurate to satisfy a threshold described by the threshold data 196. Assurance area data includes digital data that describes an assurance area.

FIGS. 7-10 depict an example of how the value system 199 determines the assurance area for the ego vehicle 123 in some embodiments. In some embodiments, each ITS station (e.g., the ego vehicle 123 or some other ITS station) in the operating environment 100 includes a value system 199 that calculates the assurance area for that particular ITS station. In some embodiments, this calculation occurs either periodically or when a status of the ITS station has changed (e.g., a status of the ego vehicle 123 changes, for example, when its geographical location changes). In some embodiments, a method for calculating the assurance area for an ITS station is described below with reference to FIGS. 7-10.

In some embodiments, perception accuracy may vary over time (e.g., due to sensor contamination, new stationary obstacles, etc.). In some embodiments, the value system 199 includes code and routines that are operable to update the perception accuracy model 197 accordingly to identify the assurance areas appropriately. In some embodiments, the value system 199 periodically analyzes the history of their own perception results (e.g., perception data 191) to detect possible changes in accuracy characteristics (e.g., if the number of detected objects in a particular sub-region of the sensor field of view has significantly decreased since a certain point in time, the value system 199 determines that sensor contamination has occurred and so, the value system 199 reduces the size of its assurance area).

In some embodiments, the value system 199 probabilistically includes perception data 191 in the payload for a CPM even if positions of the corresponding objects are within the assurance areas of any other remote ITS stations. For example, the value system 199 of the ego vehicle 123 compares the perception data 191 of the ego vehicle 123 with the perception data 191 of a remote ITS station (e.g., the remote vehicle 124) to check consistency among these instances of perception data 191.

The assurance area data structure 179 includes a data structure that stores and organizes instances of assurance area calculations. For example, the assurance area data structure 179 is a data structure that stores and organizes instances of assurance area data. In some embodiments, the assurance area data structure 179 is a database that stores and organizes the assurance area data that is generated by the value system 199. In some embodiments, the value system 199 builds the assurance area data structure 179 using the assurance area data that it determines or receives from other remote ITS stations. A remote ITS station is any ITS station that is not the ego vehicle 123. For example, the remote vehicle 124 is a remote ITS station.

In some embodiments, the ego vehicle 123 includes a vehicle control system. A vehicle control system includes one or more ADAS systems or an autonomous driving system.

The value determination data 178 includes digital data that describes a value of sensor data 195 recorded by a particular sensor included in the sensor set 126 based on the mounting height of that sensor. For example, the sensor set 126 includes a first sensor that is a lidar sensor and the value determination data 178 includes digital data that describes the value of the sensor data 195 recorded by the lidar sensor based on the mounting height of the lidar sensor on the ego vehicle 123. The mounting height is a measure of how high the sensor is mounted on an ITS station (e.g., the ego vehicle 123) relative to some plane. One example of a plane that is usable for determining a mounting height of a sensor is the roadway surface. Another example of a plane that is usable for determining a mounting height of a sensor is a height above sea level. Other examples of planes are possible.

In some embodiments, the value determination data 178 describes a value of an instance of perception data 191. For example, perception data 191 is generated based on one or more instances of sensor data 195 and the value of the perception data 191 corresponds to the value of the sensor data 195 which is used to generate the perception data 191.

Correspondence between the value of sensor data 195 and the value of perception data 191 is now described according to some embodiments. In some embodiments, if the value of an instance of sensor data 195 is "X," then the value of the perception data 191 which is generated based on this instance of sensor data 195 is "X."

In some embodiments, the perception data 191 is generated based on multiple instances of sensor data 195. In these embodiments, the value of the perception data 191 is determined by assigning a weight to the instances of sensor data 195 based on their overall contribution to the generation of the perception data 191, and then calculating the value of the perception data 191 based on (1) the value of the multiple instances of sensor data 195 used to generate the perception data 191 and (2) the weight assigned to each instance of sensor data 195 that is used to generate the perception data 191.

In some embodiments, the value system 199 is operable to determine that the value of the sensor data 195 recorded by a particular sensor is directly proportional to the mounting height of the particular sensor. For example, a higher mounting height for a particular sensor corresponds to a higher value of the sensor data 195 recorded by this particular sensor.

In some embodiments, the memory 127 stores type data for each sensor included in the sensor set 126. Type data includes digital data that describes information about each sensor including, for example, one or more of the following: a mounting point of the sensor; a mounting height of the sensor; a type of the sensor (e.g., lidar, accelerometer, camera, etc.); and a field of view of the sensor.

Figure 4:
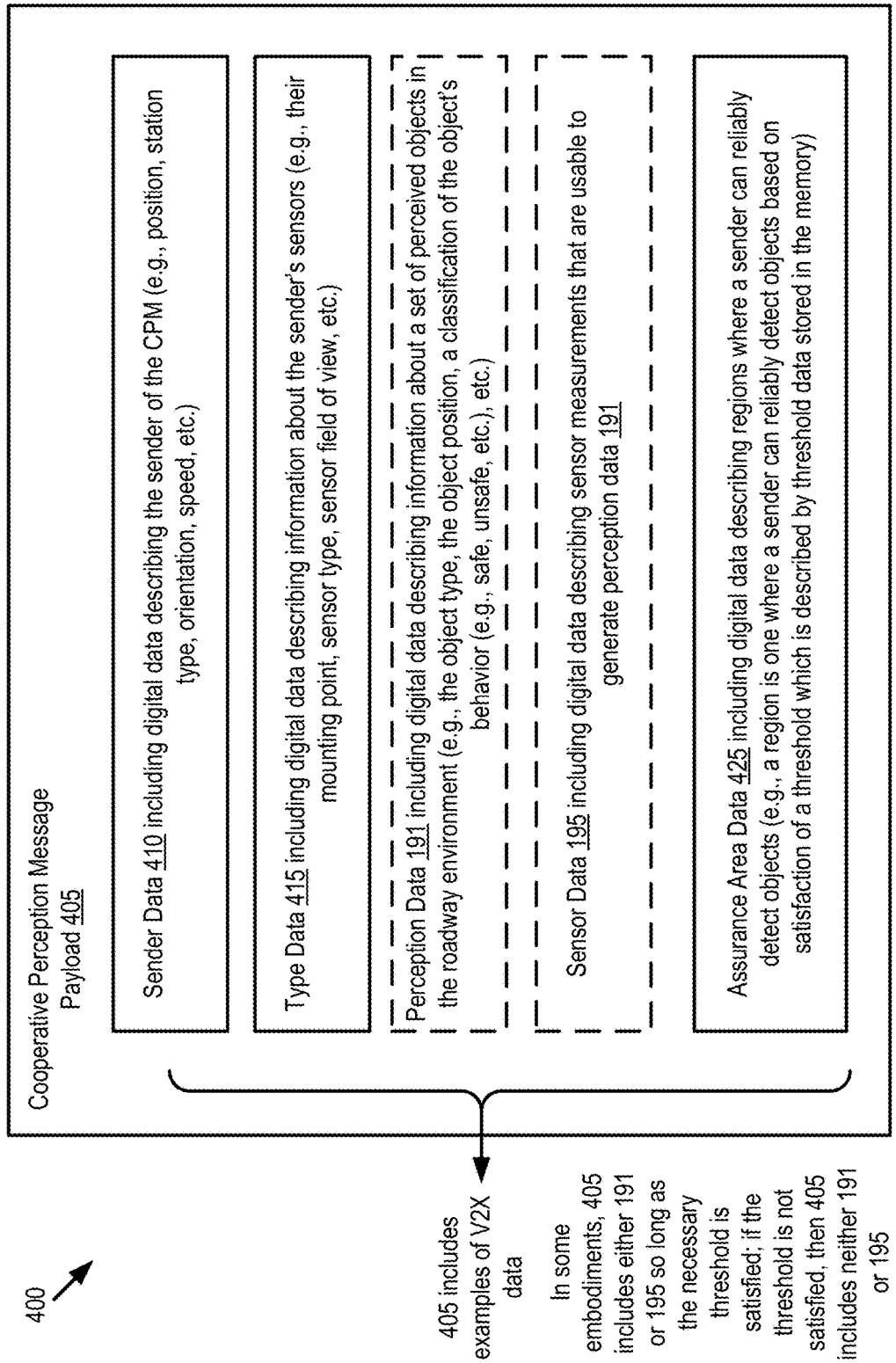
FIG. 4 is a block diagram of a payload for a cooperative perception message (CPM) according to some embodiments.

In some embodiments, the memory 127 stores the cooperative perception message payload 405 depicted in FIG. 4.

In some embodiments, the cooperative perception message payload 405 includes perception data 191. In some embodiments, the threshold data 196 describes a threshold for value that must be satisfied for perception data 191 to be included in the cooperative perception message payload 405 by the value system 199. The value of the perception data 191 corresponds to the value of the sensor data 195 which is used to generate the perception data 191. In some embodiments, the threshold describes a minimum value that must be satisfied by the value of the perception data 191. In some embodiments, the value system 199 determines the value of the sensor data 195 based on the mounting height of the sensor that records the sensor data 195. Perception data 191 is generated based on this sensor data 195 and the value of the perception data 191 corresponds to the value of the sensor data 195 which is used to generate the perception data 191. In some embodiments, the value system 199 includes code and routines that are operable to determine if the value of the perception data 191 satisfies the threshold for value: if the threshold is satisfied, then the perception data 191 is included in a cooperative perception message payload 405 of a CPM that is transmitted by the communication unit 145; and if the threshold is not satisfied, then the perception data 191 is not included in the cooperative perception message payload 405 of the CPM that is transmitted by the communication unit 145 so that transmission of this not valuable perception data 191 is suppressed by the value system 199.

In some embodiments, the cooperative perception message payload 405 includes sensor data 195 and not perception data 191. In some embodiments, the threshold data 196 describes a threshold for value that must be satisfied for sensor data 195 to be included in the cooperative perception message payload 405 by the value system 199. In some embodiments, the threshold describes a minimum value that must be satisfied by the value of the sensor data 195. In some embodiments, the value system 199 determines the value of the sensor data 195 based on the mounting height of the sensor that records the sensor data 195. In some embodiments, the value system 199 includes code and routines that are operable to determine if the value of the sensor data 195 satisfies the threshold for value: if the threshold is satisfied, then the sensor data 195 is included in a cooperative perception message payload of a CPM that is transmitted by the communication unit 145; and if the threshold is not satisfied, then the sensor data 195 is not included in the cooperative perception message payload of the CPM that is transmitted by the communication unit 145 so that transmission of this not valuable sensor data 195 is suppressed by the value system 199.

In some embodiments, the ego vehicle 123 includes an ADAS system. Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system of the ego vehicle 123 that is operable to identify one or more factors (e.g., using one or more onboard vehicle sensors) affecting the ego vehicle 123 and modify (or control) the operation of the ego vehicle to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle may have a LKA system installed and operational in an ego vehicle may detect, using one or more external cameras of the ego vehicle, an event in which the ego vehicle is near passing a center yellow line which indicates a division of one lane of travel from another lane of travel on a roadway. The LKA system may provide a notification to a driver of the ego vehicle that this event has occurred (e.g., an audible noise or graphical display) or take action to prevent the ego vehicle from actually passing the center yellow line such as making the steering wheel difficult to turn in a direction that would move the ego vehicle over the center yellow line or actually moving the steering wheel so that the ego vehicle is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

In some embodiments, the value system 199 includes code and routines that are operable, when executed by the processor 125, to execute one or more steps of one or more of the following methods: method 300 depicted in FIG. 3, method 1100 depicted in FIG. 11, and method 1200 depicted in FIG. 12.

Figure 2:
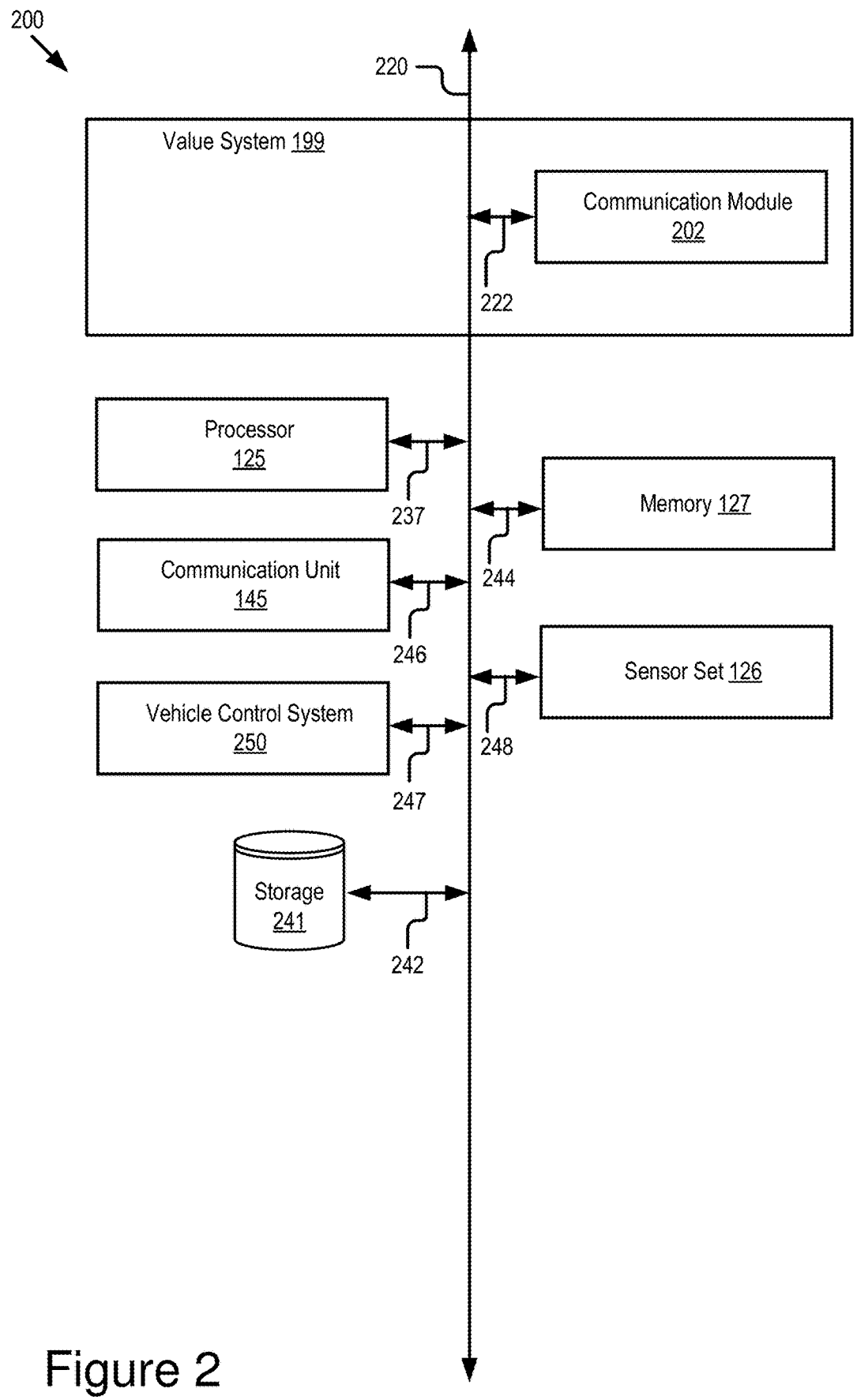
FIG. 2 is a block diagram illustrating an example computer system including a value system according to some embodiments.

An example embodiment of the value system 199 is depicted in FIG. 2. This embodiment is described in more detail below.

In some embodiments, the value system 199 is an element of the onboard unit 139 or some other onboard vehicle computer.

In some embodiments, the value system 199 includes an object engine 161 and a value-anticipating module 162. These elements are depicted with a dashed line in FIG. 1 to indicate that they are optional features of the value system 199.

In some embodiments, the object engine 161 includes code and routines that are operable, when executed by the processor 125, to cause the processor 125 to receive the sensor data 195 and generate the perception data 191. In some embodiments, the object engine 161 includes a set of object priors that are usable to analyze the sensor data 195, detect objects, and determine information about the objects such as their type, location, their behavior, and a classification of their behavior. The classification describes, for example, whether the objects are behaving in a manner that is unsafe or risky for the ego vehicle 123. In this way, the object engine 161 generates the perception data 191 based on the sensor data 195. In some embodiments, the object engine 161 includes the results of a set of digital twin simulations to assist the value system 199 in determining object type and the classification of the object behavior.

In some embodiments, the value-anticipating module 162 includes code and routines that are operable, when executed by the processor 125, to cause the processor 125 to receive and parse data from CPMs which are received from remote IP stations, build and transmit the CPMs for the ego vehicle 123; provide digitating data describing an assurance areas of the remote IT stations to the assurance area data structure (e.g., based on the data parsed from CPMs received from the remote IT stations, e.g., the payload of these CPMs which is similar to the payload depicted in FIG. 4), provide digital data to the perception accuracy model 197 to update the perception accuracy model; and receive digital data describing the assurance area of the ego vehicle 123 which is then used, for example, by the value-anticipating module 162 to build the CPMs for the ego vehicle 123.

The functionality of the value-anticipating module 162 and the object engine 161 is explained in more detail below with reference to the architecture 500 depicted in FIG. 5.

In some embodiments, the value system 199 is implemented using hardware including a field-programmable gate array ("FPGA") or an application-specific integrated circuit ("ASIC"). In some other embodiments, the value system 199 is implemented using a combination of hardware and software.

The remote vehicle 124 includes elements and functionality which are similar to those described above for the ego vehicle 123, and so, those descriptions will not be repeated here.

In some embodiments, the ego vehicle 123, the remote vehicle, and the roadside device 150 are located in a roadway environment 140. The roadway environment is a portion of the real-world that includes a roadway, the ego vehicle 123, the remote vehicle 124 and the roadside device 150. The roadway environment 140 may include other elements such as the vehicular micro cloud 194, roadway signs, environmental conditions, traffic, etc. The roadway environment 140 includes some or all of the tangible and/or measurable qualities described above with reference to the sensor data.

In some embodiments, the real-world includes the real of human experience comprising physical objects and excludes artificial environments and "virtual" worlds such as computer simulations that are executed in the digital twin simulations which are executed by the value system 199 in some embodiments.

In some embodiments, the roadway environment 140 includes a roadside device 150 that in includes an edge server 104. The edge server 104 is a connected processor-based computing device that is not a member of the vehicular micro cloud 194 and includes an instance of the value system 199 and a memory 127. The value system 199 is depicted in FIG. 1 with a dashed line as both an element of the edge server 104 and an element of the roadside device 150 which is independent of the edge server 104. The purpose of this depiction is to indicate that the roadside device 150 includes a value system 199, and that in some embodiments this value system 199 is an element of the edge server 104 whereas in some embodiments this value system 199 is an element of the roadside device 150 but not included in the edge server 104.

In some embodiments, the edge server 104 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the value system 199 and a non-transitory memory that stores some or all of the digital data that is stored by the memory 127 of the ego vehicle 123 or otherwise described herein. The edge server 104 may include a backbone network.

In some embodiments, the value system 199 includes code and routines that are operable, when executed by the processor 125, to execute one or more steps of one or more of the following methods: method 300 depicted in FIG. 3, method 1100 depicted in FIG. 11, and method 1200 depicted in FIG. 12. In some embodiments, the value system 199 executes a method to calculate the assurance area. An example embodiment of the value system 199 is depicted in FIG. 2. This embodiment is described in more detail below.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, etc.), and optionally devices such as a roadside device 150, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the value system 199 includes encryption keys for encrypting wireless messages and decrypting the wireless messages described herein.

Referring now to FIG. 2, depicted is a block diagram illustrating an example computer system 200 including a value system 199 according to some embodiments.

In some embodiments, the computer system 200 may include a special-purpose computer system that is programmed to perform one or more steps of one or more of the following methods: method 300 depicted in FIG. 3, method 1100 depicted in FIG. 11, and method 1200 depicted in FIG. 12.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the value system 199; a processor 125; a communication unit 145; a vehicle control system 250; a storage 241; and a memory 127. The components of the computer system 200 are communicatively coupled by a bus 220.

Figure 5:
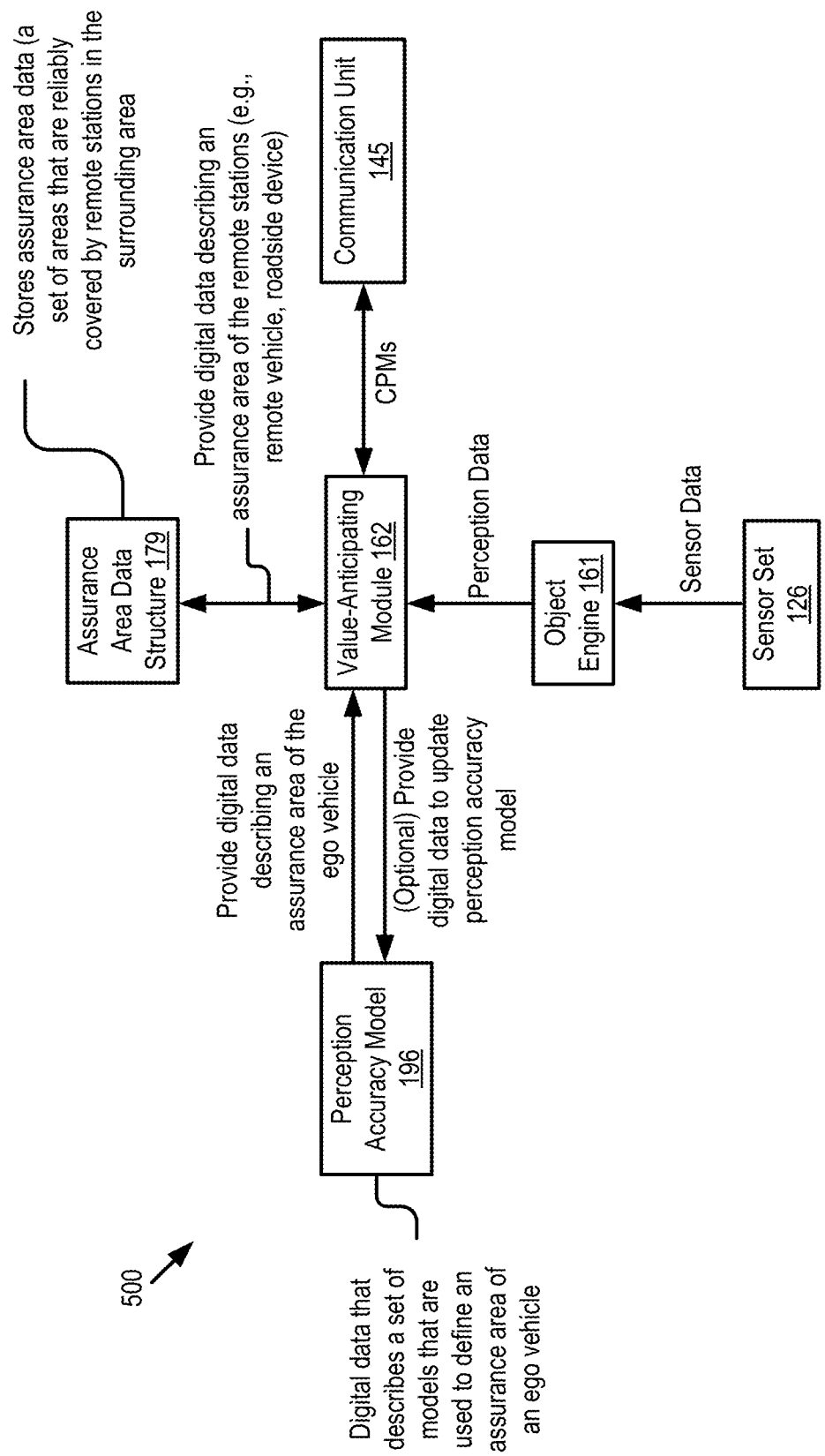
FIG. 5 is a block diagram of an example architecture for providing value-anticipating cooperative perception with an ITS according to some embodiments.

In some embodiments, the computer system 200 includes additional elements such as those depicted in FIG. 5.

In the illustrated embodiment, the processor 125 is communicatively coupled to the bus 220 via a signal line 237. The communication unit 145 is communicatively coupled to the bus 220 via a signal line 246. The vehicle control system 250 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 250; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the value system 199 includes code and routines that are operable, when executed by the processor 125, to cause the processor 125 to execute one or more steps of one or more of the following methods: method 300 depicted in FIG. 3, method 1100 depicted in FIG. 11, and method 1200 depicted in FIG. 12.

In the illustrated embodiment shown in FIG. 2, the value system 199 includes a communication module 202.

The communication module 202 can be software including routines for handling communications between the value system 199 and other components of the computer system 200. In some embodiments, the communication module 202 can be a set of instructions executable by the processor 125 to provide the functionality described below for handling communications between the value system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the value system 199 and stores the data in one or more of the storage 241 and the memory 127.

In some embodiments, the communication module 202 may handle communications between components of the value system 199 or the computer system 200.

Referring now to FIG. 3, depicted is a flowchart of an example method 300. The method 300 includes step 305, step 310, step 315, and step 320 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

In some embodiments, a higher value is assigned to sensor data and/or perception data if the sensor which is used to generate the sensor data and/or the perception data is mounted higher. In some embodiments, a lower value is assigned to sensor data and/or perception data if the sensor which is used to generate the sensor data and/or the perception data is mounted lower. In other words, the value is directly proportional to the mounting height of the sensor.

In some embodiments, a higher value is assigned to sensor data and/or perception data if the sensor which is used to generate the sensor data and/or the perception data has a smaller overlap with the field of view of a remote ITS station (e.g., a remote vehicle or a roadside device). In some embodiments, a lower value is assigned to sensor data and/or perception data if the sensor which is used to generate the sensor data and/or the perception data has a higher overlap with the field of view of the remote ITS station. In other words, the value is inversely proportional to the field of view overlap between a sensor of an ego ITS station that executes the method 300 and a sensor of a remote ITS station.

In some embodiments, each ITS station declares an "assurance area" for itself. The value system of the ITS station suppress transmissions of perception data (or sensor data) only if: (1) the object position is beyond its own assurance area; and (2) included in any other remote station's assurance area. These embodiments beneficially help avoid false positive suppression where vehicles decide not to send information about the objects that are actually missed/inaccurately perceived by infrastructure/remote vehicles with a better field of view. For example, the method 300 is configured so that the value-based sensor data suppression is implemented if: (1) the sensor data describes an object whose geographic position is beyond an assurance area of the ego vehicle; and (2) included in an assurance of a remote station (e.g., a remote vehicle, a roadside device, or any other ITS station that is not implementing the method 300).

Example differences in technical effect between the method 300 and the prior art are described below. These examples are illustrative and not exhaustive of the possible differences.

Frameworks for cooperative perception and the transmission of cooperative perception messages among connected vehicles exist. However, these frameworks do not foresee or address the problem of cooperative perception messages creating a bottleneck in V2X channels. These frameworks also do not propose any ideas for suppressing cooperative perception messages, much less determining the value of different instances of sensor data measurements (or perception data based on these sensor data measurements) and suppressing cooperative perception messages based on this determination of value.

A first difference in technical effect is that in some embodiments the value system determines the value of different instances of sensor data and suppresses cooperative perception messages, or the sensor data included in these cooperative perception messages, based on whether this value satisfies a threshold.

A second difference in technical effect is that in some embodiments the value system determines the value of different instances of perception data and suppresses cooperative perception messages, or the perception data included in these cooperative perception messages, based on whether this value satisfies a threshold.

A third difference in technical effect is that in some embodiments the present invention determines the value of a particular sensor's sensor data based on the mounting height of the sensor.

A fourth difference in technical effect is that in some embodiments the present invention determines the value of an instance of perception data based on the mounting height of the sensor whose sensor data was used to determine the instance of perception data.

A fifth difference in technical effect is that in some embodiments the present invention determines the value of a first sensor's sensor data based on whether the field of view of the first sensor overlaps the field of view of a second sensor that is an element of a roadside device which is being assisted by a connected vehicle that includes the first sensor.

A sixth difference in technical effect is that in some embodiments the present invention determines the value of a first sensor's sensor data based on whether the sensor data includes information about an object that is occluded from a field of view of a second sensor that is an element of a roadside device.

All of the references described herein have be reviewed, and the differences in technical effect described above were found in none of these references.

Referring now to FIG. 4, depicted is a block diagram of a payload 400 for a cooperative perception message (CPM) according to some embodiments. As depicted, the payload includes one or more of the following elements: 410; 415; 191; 195; 425. In some embodiments, these elements are examples of V2X data.

In some embodiments, the payload 405 includes either the perception data 191 or the sensor data 195 (but not both) so long as the necessary threshold is satisfied (e.g., step 315 of the method 300); if the threshold is not satisfied, then the payload 405 includes neither the perception data 191 or the sensor data 195 because the transmission of this digital data is suppressed by the value system 199.

A receiver-oriented approach is now described according to some embodiments.

In some embodiments, the payload 405 includes data fields that describe or more of the following: (1) sender's station type (i.e., vehicle or RSU); (2) position and orientation of a sender vehicle/RSU; (3) the mounting position of sensor(s); and (4) range and opening angles of sensor(s). In some embodiments, receivers of the CPM (instead of senders) estimate sender's assurance area based on the data fields above and a generic perception accuracy model. A benefit to this approach is that there is no need to include additional data field (i.e., assurance area data) into CPMs. A negative aspect of this approach is that the estimated assurance area might be inaccurate (or have to be more conservative) since the generic perception accuracy model is not tailored to each station.

Referring now to FIG. 5, depicted is a block diagram of an example architecture 500 for providing value-anticipating cooperative perception with an ITS according to some embodiments.

Figure 6:
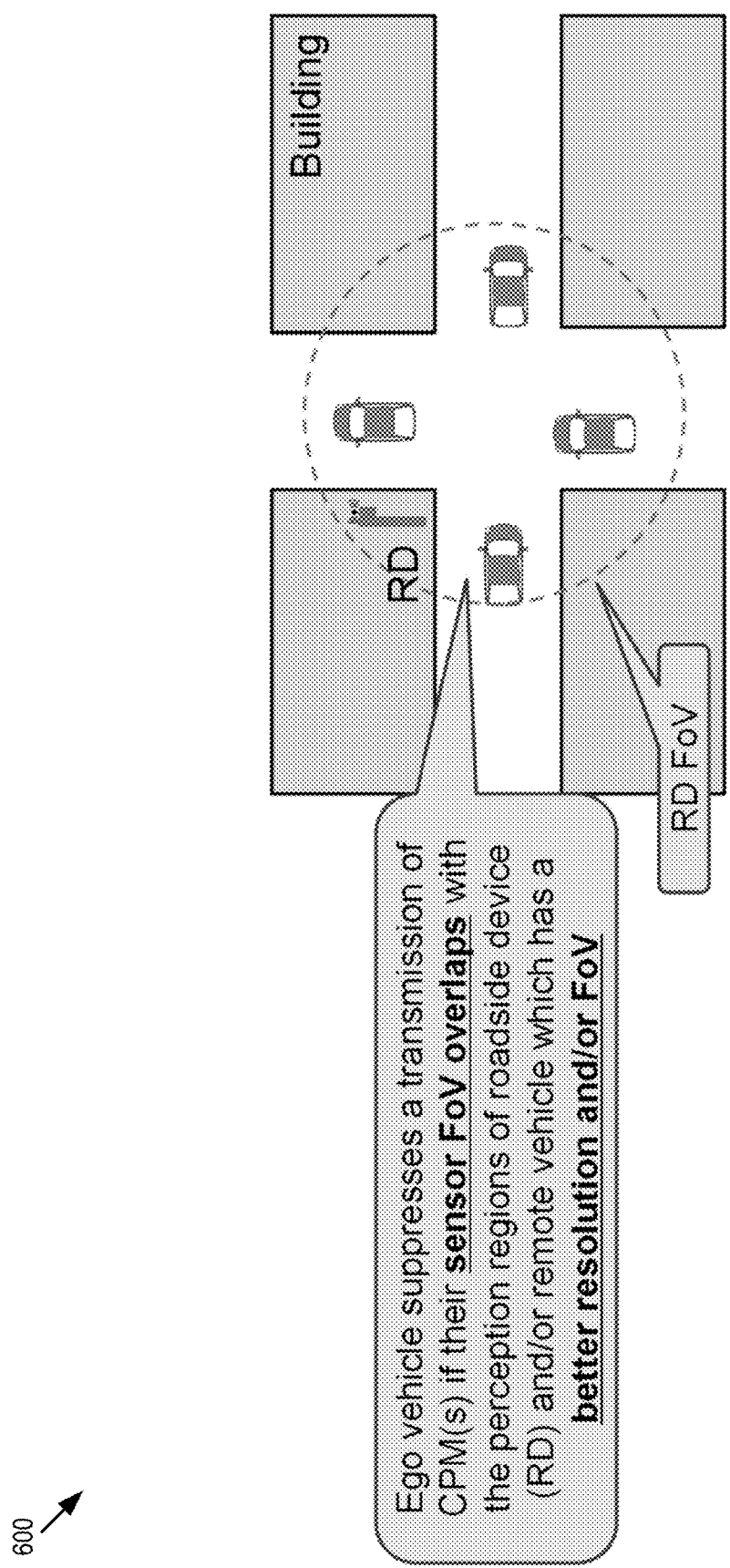
FIG. 6 is a block diagram of an example operating environment for the value system according to some embodiments.

Referring now to FIG. 6, depicted is a block diagram of an example operating environment 600 for the value system according to some embodiments. This operating environment 600 is now described to provide an example benefit of the value system according to some embodiments.

Some road intersections have roadside devices ("RD" if singular, "RDs" if plural) with accurate sensors (e.g., high-resolution cameras, etc.) and/or other sensor infrastructure to measure the roadway environment. RD-mounted sensors (e.g., cameras, radar sensors, lidar sensors) can capture a bird's eye view that is relatively free from occlusion. Some sensors (e.g., loop detectors) are occlusion-free in nature.

Automated driving vehicles and some other classes of vehicles (e.g., buses, trucks) may have sensors at a higher position (and possibly with higher precision and/or resolution) than other vehicles, leading to a better field of view (FoV).

In some embodiments, the value system of the ego vehicle suppresses a transmission of CPM(s) (or the sensor data/perception data included in the CPM) if their sensor FoV overlaps with the perception regions of roadside device (RD) and/or remote vehicle which has a better resolution and/or FoV.

Referring now to FIGS. 7-10, depicted are block diagrams of an example calculation of an assurance area according to some embodiments.

The value system of an ITS station (e.g., a vehicle or a roadside device) calculates its own assurance area either periodically or when its status (e.g., vehicle's position) has changed. In some embodiments, the value system of an ITS station looks up the perception accuracy model and executes the method described with reference to FIGS. 7-10 to identify the area where the sensors of the ITS station can perceive objects reliably In some embodiments, the assurance area is defined conservatively, such that the possibility of missing objects within the assurance area becomes significantly low.

Figure 7:
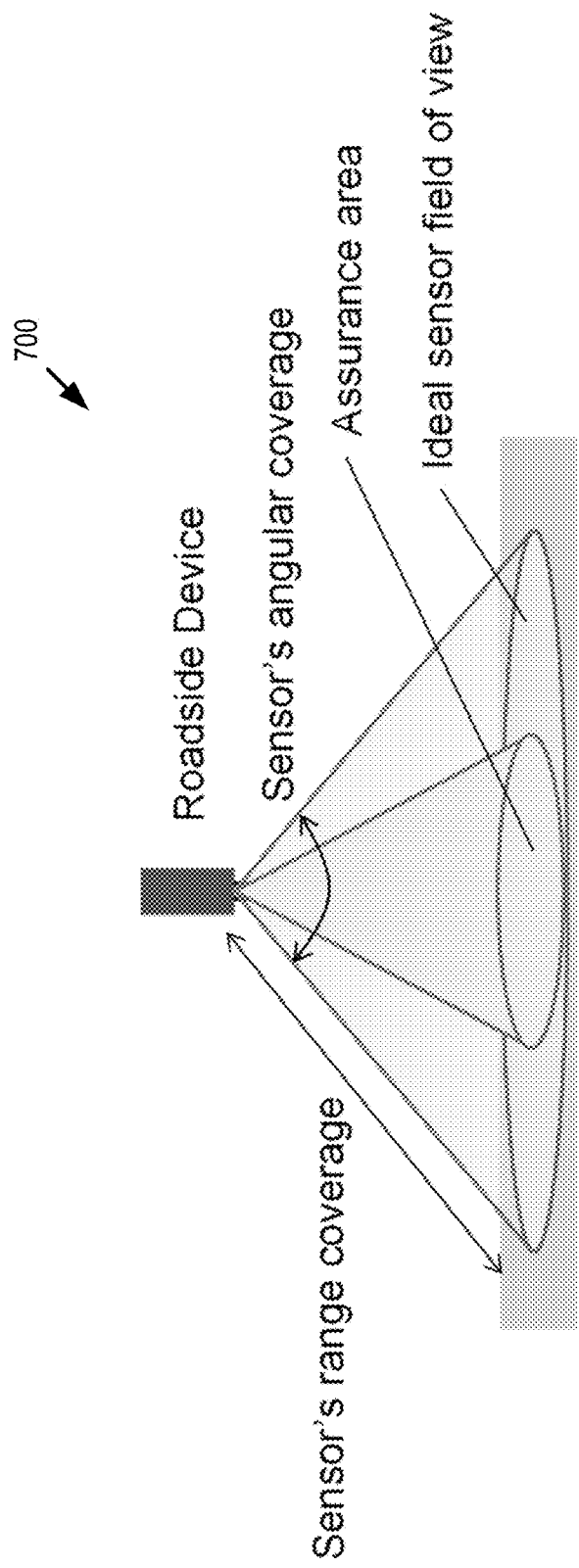
FIGS. 7-10 are block diagrams of an example calculation of an assurance area according to some embodiments.

In some embodiments, the assurance areas of vehicles tend to change more quickly than RSUs because of their mobility Referring to the diagram 700 of FIG. 7, in some embodiments, based on the mounting position, range and angular coverage of sensors, the value system of an ego vehicle calculates its own ideal sensor field of view by projecting the area on the ground. Objects around the boundary of the ideal sensor field of view may not be reliably perceived by the sensors of the ego vehicle due to limitations of the perception algorithm and sensor resolution, potential occlusion by obstacles, etc. Accordingly, the value system causes the processor to execute steps to narrow down the ideal sensor field of view to define an assurance area. In some embodiments, an assurance area is an area where an ITS station's sensors can reliably perceive objects, considering various factors described below with reference FIGS. 8-10.

Figure 8:
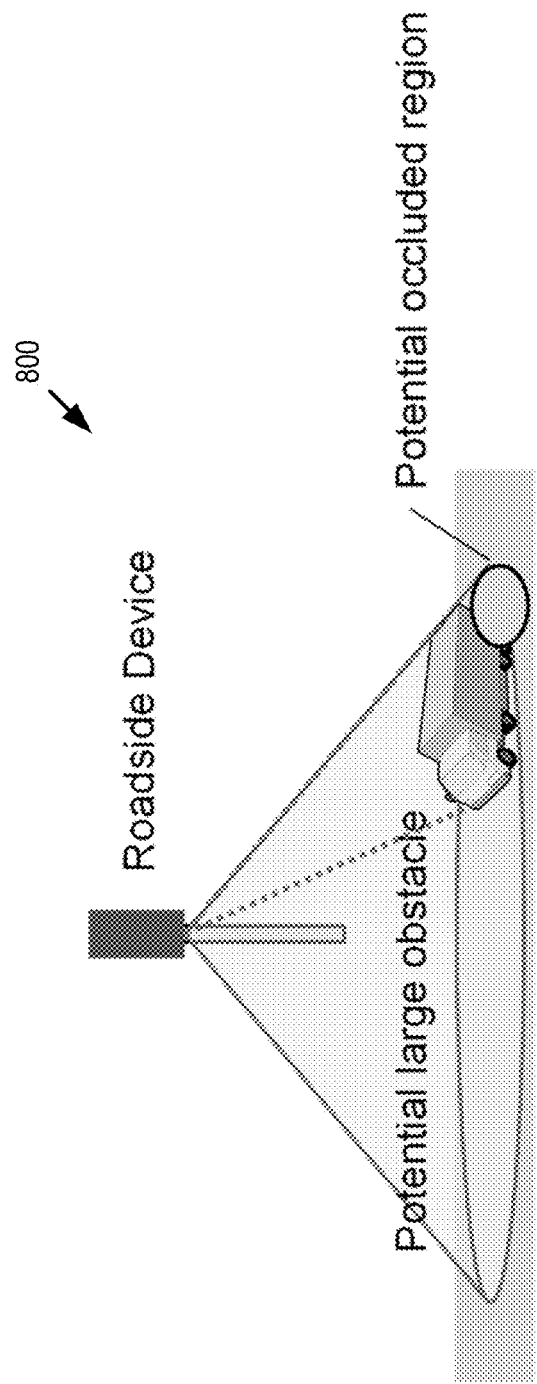

Referring now to the diagram 800 of FIG. 8, explained according to some embodiments is the impact of a potential occlusion as a factor in the value system's calculations of an assurance area.

In some embodiments, the value system includes codes and routines that are operable, when executed by the processor, to cause the processor to place a largest possible road object at varying positions in the ideal sensor field of view to simulate potential occlusion, and subtract the sub-regions which are possibly occluded by the object. In some embodiments, the value system includes codes and routines that are operable, when executed by the processor, to cause the processor to consider occlusion by static objects in the surroundings (e.g., buildings, trees, etc.) based on a map data and/or a history of perception data (e.g., regions where no objects have been detected for a long period of time could be considered to be occluded). The assurance area is defined by the remaining sub-regions.

Figure 9:
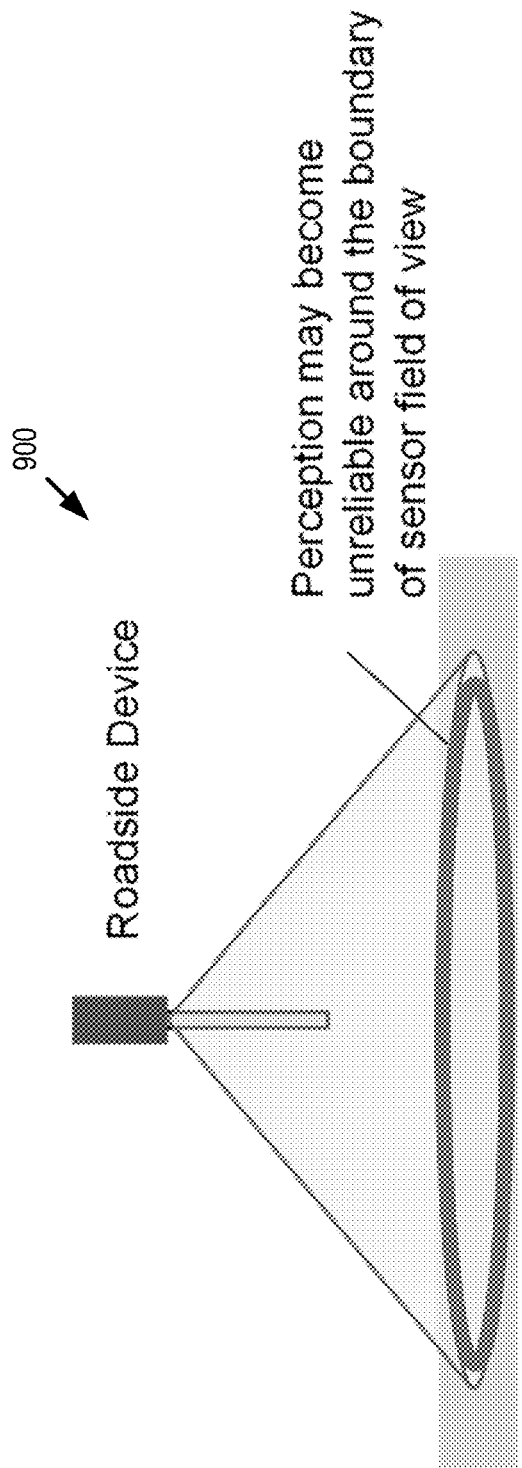

Referring now to the diagram 900 of FIG. 9, explained according to some embodiments is the impact of the limitations of perception algorithms and sensor resolution as factors in the value system's calculations of an assurance area.

Perception may become unreliable around the boundary of sensor field of view. In some embodiments, each station keeps its own perception accuracy model that encodes reliability of perception at different positions in the ideal field of view. The perception accuracy model may be different among stations depending on sensor specifications and perception algorithms installed therein. In some embodiments, the value system includes codes and routines that are operable, when executed by the processor, to cause the processor to subtract the sub-regions whose expected reliability is less than a pre-defined threshold.

Figure 10:
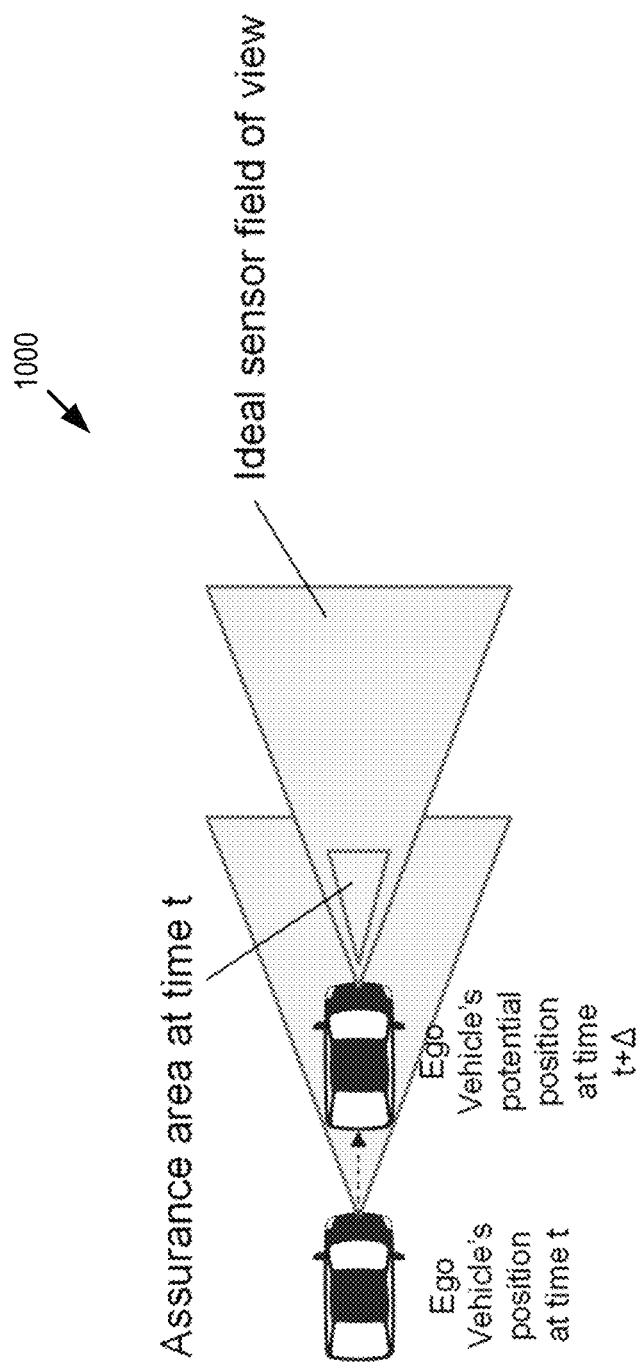

Referring now to the diagram 1000 of FIG. 10, in some embodiments is the impact of the potential movement of sensors as a factor in the value system's calculations of an assurance area.

Field of view of vehicle-mounted sensors may vary due to vehicle's motion. In this case, the value system in some embodiments includes code and routines that are operable, when executed by a processor, to cause the processor to: define an assurance area by the sub-region where the vehicle can always reliably perceive objects for a pre-defined period A (e.g., until it sends the next CPM); simulate all the possible movement during the Δ period; and exclude the regions where it potentially misses objects from the assurance area.

In some embodiments, each vehicle includes its own assurance area data into a CPM if pre-defined conditions are met. Possible conditions include, but are not limited to, one or more of the following: a certain time period has elapsed since the last time it included the assurance area data; and the assurance area has changed more than a designated threshold since the last time it included the assurance area data.

Referring now to FIG. 11, depicted is a flowchart of an example method 1100 for transmitting a CPM according to some embodiments. The method 1100 includes the following steps: 1105; 1110; 1115; 1120; 1125; 1130; and 1135.

In some embodiments, each vehicle includes its own assurance area data into a CPM if a pre-defined conditions are met. Possible conditions include, but are not limited to, one or more of the following: a certain time period has elapsed since the last time it included the assurance area data; and the assurance area has changed more than a designated threshold since the last time it included the assurance area data Referring now to FIG. 12, depicted is a flowchart of an example method 1200 for receiving a CPM according to some embodiments. The method 1200 includes the following steps: 1205; 1210; 1215; and 1220.

In some embodiments, perception accuracy may vary over time (e.g., due to sensor contamination, new stationary obstacles, etc.). In some embodiments, the value system includes code and routines that are operable to update the perception accuracy model accordingly to identify the assurance areas appropriately. In some embodiments, the value system periodically analyzes the history of their own perception results (e.g., perception data) to detect possible changes in accuracy characteristics (e.g., if the number of detected objects in a particular sub-region of the sensor field of view has significantly decreased since a certain point in time, the value system determines that sensor contamination has occurred and so, the value system reduces the size of its assurance area).

In some embodiments, the value system probabilistically includes perception data in the payload for a CPM even if positions of the corresponding objects are within the assurance areas of any other remote ITS stations. For example, the value system of the ego vehicle compares the perception data of the ego vehicle with the perception data of a remote ITS station (e.g., the remote vehicle) to check consistency among these instances of perception data.

In some embodiments, the value system probabilistically includes sensor data in the payload for a CPM even if positions of the corresponding objects are within the assurance areas of any other remote ITS stations. For example, the value system of the ego vehicle compares the sensor data of the ego vehicle with the sensor data of a remote ITS station (e.g., the remote vehicle) to check consistency among these instances of sensor data.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for value-based sensor data suppression in a cooperative perception message transmission by an ego vehicle, the method comprising:
    ascertaining, by a processor of the ego vehicle, a mounting height of a first sensor of the ego vehicle;
    calculating a value of sensor data recorded by the first sensor based on the mounting height;
    determining a satisfaction state of a threshold based on the value; and
    determining to transmit the cooperative perception message without the sensor data based on the satisfaction state of the threshold so that value-based sensor data suppression is achieved.

2. The method of claim 1, wherein the mounting height describes a vertical height of a mounting point of the first sensor relative to a surface beneath the ego vehicle.

3. The method of claim 1, wherein the value is higher when the mounting height is higher.

4. The method of claim 1, wherein the value is lower if the mounting height is lower.

5. The method of claim 1, wherein the value is further calculated based on whether a first field of view of the first sensor overlaps a second field of view of a second sensor that is an element of a roadside device.

6. The method of claim 5, wherein the value is higher when an overlap between the first field of view and the second field of view is less.

7. The method of claim 5, wherein the value is lower when an overlap between the first field of view and the second field of view is more.

8. The method of claim 5, wherein the roadside device is not in motion.

9. The method of claim 1, wherein the value is further calculated based on whether sensor data includes information about an object that is occluded from a field of view of a second sensor that is an element of a roadside device.

10. The method of claim 9, wherein the value is higher when the sensor data includes information about the object.

11. The method of claim 1, wherein false positives are reduced by modifying the method so that the value-based sensor data suppression is only implemented if: (1) the sensor data describes an object whose geographic position is beyond an assurance area of the ego vehicle; and (2) the object described by the sensor data is included in an assurance of a remote station.

12. A computer program product included in at least one onboard vehicle computer for providing value-based sensor data suppression in a cooperative perception message transmission by an ego vehicle, the computer program product comprising computer code that is operable, when executed by the onboard vehicle computer, to cause the onboard vehicle computer to execute steps including:
    ascertaining, by a processor of the ego vehicle, a mounting height of a first sensor of the ego vehicle;
    calculating a value of sensor data recorded by the first sensor based on the mounting height;
    determining a satisfaction state of a threshold based on the value; and
    determining to transmit the cooperative perception message without the sensor data based on the satisfaction state of the threshold so that value-based sensor data suppression is achieved.

13. The computer program product of claim 12, wherein the mounting height describes a vertical height of a mounting point of the first sensor relative to a surface beneath the ego vehicle.

14. The computer program product of claim 12, wherein the value is higher when the mounting height is higher.

15. The computer program product of claim 12, wherein the value is lower if the mounting height is lower.

16. The computer program product of claim 12, wherein the value is further calculated based on whether a first field of view of the first sensor overlaps a second field of view of a second sensor that is an element of a roadside device.

17. The computer program product of claim 16, wherein the value is higher when an overlap between the first field of view and the second field of view is less.

18. The computer program product of claim 16, wherein the value is lower when an overlap between the first field of view and the second field of view is more.

19. The computer program product of claim 16, wherein the roadside device is not in motion.

20. A system included in a connected vehicle for providing value-based sensor data suppression in a cooperative perception message transmission by an ego vehicle, the system comprising:
    a processor;
    a communication unit communicatively coupled to the processor; and
    a non-transitory memory communicatively coupled to the processor and the communication unit, wherein the non-transitory memory stores executable code that is operable, when executed by the processor, to cause the processor to:
        ascertain, by a processor of the ego vehicle, a mounting height of a first sensor of the ego vehicle;
        calculate a value of sensor data recorded by the first sensor based on the mounting height;
        determine a satisfaction state of a threshold based on the value; and
        determine to transmit the cooperative perception message without the sensor data based on the satisfaction state of the threshold so that value-based sensor data suppression is achieved.

* * * * *